(12) United States Patent
May et al.

(10) Patent No.: US 7,210,129 B2
(45) Date of Patent: Apr. 24, 2007

(54) METHOD FOR TRANSLATING PROGRAMS FOR RECONFIGURABLE ARCHITECTURES

(75) Inventors: Frank May, München (DE); Armin Nückel, Neupotz (DE); Martin Vorbach, München (DE)

(73) Assignee: PACT XPP Technologies AG, Munich (DE)

( * ) Notice: Subject to any disclaimer, the term of this patent is extended or adjusted under 35 U.S.C. 154(b) by 596 days.

(21) Appl. No.: 09/967,847

(22) Filed: Sep. 28, 2001

(65) Prior Publication Data

US 2003/0056202 A1    Mar. 20, 2003

(30) Foreign Application Priority Data

| Aug. 16, 2001 | (DE) | ................. 101 39 170 |
| Sep. 3, 2001 | (DE) | ................. 101 42 903 |
| Sep. 11, 2001 | (DE) | ................. 101 44 732 |
| Sep. 17, 2001 | (DE) | ................. 101 45 792 |

(51) Int. Cl.
*G06F 9/45* (2006.01)

(52) U.S. Cl. ............... 717/136; 717/141; 717/151; 717/121; 717/166; 712/15; 712/245

(58) Field of Classification Search ........ 717/136–167, 717/121; 712/2–15, 245

See application file for complete search history.

(56) References Cited

U.S. PATENT DOCUMENTS

| 2,067,477 | A | 1/1937 | Cooper |
| 3,242,998 | A | 3/1966 | Gubbins |
| 3,681,578 | A | 8/1972 | Stevens |
| 3,757,608 | A | 9/1973 | Willner |
| 3,855,577 | A | 12/1974 | Vandierendonck |
| 4,498,172 | A | 2/1985 | Bhavsar |
| 4,566,102 | A | 1/1986 | Hefner |
| 4,591,979 | A | 5/1986 | Iwashita |
| 4,663,706 | A | 5/1987 | Allen et al. |
| 4,682,284 | A | 7/1987 | Schrofer |
| 4,706,216 | A | 11/1987 | Carter |
| 4,720,780 | A | 1/1988 | Dolecek |
| 4,739,474 | A | 4/1988 | Holsztynski |
| 4,761,755 | A | 8/1988 | Ardini et al. |
| 4,811,214 | A | 3/1989 | Nosenchuck et al. |
| 4,852,043 | A | 7/1989 | Guest |
| 4,852,048 | A | 7/1989 | Morton |
| 4,860,201 | A | 8/1989 | Stolfo et al. |
| 4,870,302 | A | 9/1989 | Freeman |
| 4,891,810 | A | 1/1990 | de Corlieu et al. |
| 4,901,268 | A | 2/1990 | Judd |
| 4,910,665 | A | 3/1990 | Mattheyses et al. |
| 4,967,340 | A | 10/1990 | Dawes |

(Continued)

FOREIGN PATENT DOCUMENTS

DE    42 21 278    1/1994

(Continued)

OTHER PUBLICATIONS

Arabi et al., "PLD Integrates Dedicated High-speed Data Buffering, Complex State Machine, and Fast Decode Array," conference record on WESCON '93, Sep. 28, 1993, pp. 432-436.

(Continued)

*Primary Examiner*—Todd D. Ingberg
(74) *Attorney, Agent, or Firm*—Kenyon & Kenyon LLP

(57) ABSTRACT

A method for translating high-level languages to reconfigurable architectures is disclosed. The method includes building a finite automaton for calculation. The method further includes forming a combinational network of a plurality of individual functions in accordance with the structure of the finite automaton. The method further includes allocating a plurality of memories to the network for storing a plurality of operands and a plurality of results.

3 Claims, 9 Drawing Sheets

U.S. PATENT DOCUMENTS

| | | |
|---|---|---|
| 5,014,193 A | 5/1991 | Garner et al. |
| 5,015,884 A | 5/1991 | Agrawal et al. |
| 5,021,947 A | 6/1991 | Campbell et al. |
| 5,023,775 A | 6/1991 | Poret |
| 5,043,978 A | 8/1991 | Nagler et al. |
| 5,047,924 A | 9/1991 | Fujioka et al. |
| 5,065,308 A | 11/1991 | Evans |
| 5,081,375 A | 1/1992 | Pickett et al. |
| 5,109,503 A | 4/1992 | Cruickshank et al. |
| 5,113,498 A | 5/1992 | Evan et al. |
| 5,115,510 A | 5/1992 | Okamoto et al. |
| 5,123,109 A | 6/1992 | Hillis |
| 5,125,801 A | 6/1992 | Nabity et al. |
| 5,128,559 A | 7/1992 | Steele |
| 5,142,469 A | 8/1992 | Weisenborn |
| 5,144,166 A | 9/1992 | Camarota et al. |
| 5,193,202 A | 3/1993 | Lee et al. |
| 5,203,005 A | 4/1993 | Horst |
| 5,204,935 A | 4/1993 | Mihara et al. |
| 5,208,491 A | 5/1993 | Ebeling et al. |
| 5,226,122 A | 7/1993 | Thayer et al. |
| RE34,363 E | 8/1993 | Freeman |
| 5,233,539 A | 8/1993 | Agrawal et al. |
| 5,247,689 A | 9/1993 | Ewert |
| 5,274,593 A | 12/1993 | Proebsting |
| 5,287,472 A | 2/1994 | Horst |
| 5,294,119 A | 3/1994 | Vincent et al. |
| 5,301,284 A | 4/1994 | Estes et al. |
| 5,301,344 A | 4/1994 | Kolchinsky |
| 5,303,172 A | 4/1994 | Magar et al. |
| 5,336,950 A | 8/1994 | Popli et al. |
| 5,347,639 A | 9/1994 | Rechtschaffen et al. |
| 5,349,193 A | 9/1994 | Mott et al. |
| 5,353,432 A | 10/1994 | Richek et al. |
| 5,361,373 A | 11/1994 | Gilson |
| 5,379,444 A | 1/1995 | Mumme |
| 5,410,723 A | 4/1995 | Schmidt et al. |
| 5,418,952 A | 5/1995 | Morley et al. |
| 5,421,019 A | 5/1995 | Holsztynski et al. |
| 5,422,823 A | 6/1995 | Agrawal et al. |
| 5,425,036 A | 6/1995 | Liu et al. |
| 5,426,378 A | 6/1995 | Ong |
| 5,428,526 A | 6/1995 | Flood et al. |
| 5,430,687 A | 7/1995 | Hung et al. |
| 5,440,245 A | 8/1995 | Galbraith et al. |
| 5,440,538 A | 8/1995 | Olsen et al. |
| 5,442,790 A | 8/1995 | Nosenchuck |
| 5,444,394 A | 8/1995 | Watson et al. |
| 5,448,186 A | 9/1995 | Kawata |
| 5,455,525 A | 10/1995 | Ho et al. |
| 5,457,644 A | 10/1995 | McCollum |
| 5,465,375 A | 11/1995 | Thepaut et al. |
| 5,473,266 A | 12/1995 | Ahanin et al. |
| 5,473,267 A | 12/1995 | Stansfield |
| 5,475,583 A | 12/1995 | Bock et al. |
| 5,475,803 A | 12/1995 | Stearns et al. |
| 5,475,856 A | 12/1995 | Kogge |
| 5,483,620 A | 1/1996 | Pechanek et al. |
| 5,485,103 A | 1/1996 | Pedersen et al. |
| 5,485,104 A | 1/1996 | Agrawal et al. |
| 5,489,857 A | 2/1996 | Agrawal et al. |
| 5,491,353 A | 2/1996 | Kean |
| 5,493,239 A | 2/1996 | Zlotnick |
| 5,497,498 A | 3/1996 | Taylor |
| 5,506,998 A | 4/1996 | Kato et al. |
| 5,510,730 A | 4/1996 | El Gamal et al. |
| 5,511,173 A | 4/1996 | Yamaura et al. |
| 5,513,366 A | 4/1996 | Agarwal et al. |
| 5,521,837 A | 5/1996 | Frankle et al. |
| 5,522,083 A | 5/1996 | Gove et al. |
| 5,530,873 A | 6/1996 | Takano |
| 5,530,946 A | 6/1996 | Bouvier et al. |
| 5,532,693 A | 7/1996 | Winters et al. |
| 5,532,957 A | 7/1996 | Malhi |
| 5,535,406 A | 7/1996 | Kolchinsky |
| 5,537,057 A | 7/1996 | Leong et al. |
| 5,537,601 A | 7/1996 | Kimura et al. |
| 5,541,530 A | 7/1996 | Cliff et al. |
| 5,544,336 A | 8/1996 | Kato et al. |
| 5,548,773 A | 8/1996 | Kemeny et al. |
| 5,555,434 A | 9/1996 | Carlstedt |
| 5,559,450 A | 9/1996 | Ngai et al. |
| 5,561,738 A | 10/1996 | Kinerk et al. |
| 5,570,040 A | 10/1996 | Lytle et al. |
| 5,574,930 A | 11/1996 | Halverson, Jr. et al. |
| 5,583,450 A | 12/1996 | Trimberger et al. |
| 5,586,044 A | 12/1996 | Agrawal et al. |
| 5,587,921 A | 12/1996 | Agrawal et al. |
| 5,588,152 A | 12/1996 | Dapp et al. |
| 5,590,345 A | 12/1996 | Barker et al. |
| 5,590,348 A | 12/1996 | Phillips et al. |
| 5,596,742 A | 1/1997 | Agarwal et al. |
| 5,600,265 A | 2/1997 | El Gamal et al. |
| 5,611,049 A | 3/1997 | Pitts |
| 5,617,547 A | 4/1997 | Feeney et al. |
| 5,625,806 A | 4/1997 | Kromer |
| 5,634,131 A | 5/1997 | Matter et al. |
| 5,649,176 A | 7/1997 | Selvidge et al. |
| 5,649,179 A | 7/1997 | Steenstra et al. |
| 5,652,894 A | 7/1997 | Hu et al. |
| 5,655,069 A | 8/1997 | Ogawara et al. |
| 5,655,124 A | 8/1997 | Lin |
| 5,657,330 A | 8/1997 | Matsumoto |
| 5,659,797 A | 8/1997 | Zandveld et al. |
| 5,675,743 A | 10/1997 | Mavity |
| 5,680,583 A | 10/1997 | Kuijsten |
| 5,713,037 A | 1/1998 | Wilkinson et al. |
| 5,717,943 A | 2/1998 | Barker et al. |
| 5,732,209 A | 3/1998 | Vigil et al. |
| 5,734,921 A | 3/1998 | Dapp et al. |
| 5,742,180 A | 4/1998 | Detton et al. |
| 5,748,872 A | 5/1998 | Norman |
| 5,754,827 A | 5/1998 | Barbier et al. |
| 5,754,871 A | 5/1998 | Wilkinson et al. |
| 5,760,602 A | 6/1998 | Tan |
| 5,761,484 A | 6/1998 | Agarwal et al. |
| 5,773,994 A | 6/1998 | Jones |
| 5,778,439 A | 7/1998 | Timberger et al. |
| 5,784,636 A | 7/1998 | Rupp |
| 5,794,059 A | 8/1998 | Barker et al. |
| 5,794,062 A | 8/1998 | Baxter |
| 5,801,715 A | 9/1998 | Norman |
| 5,802,290 A | 9/1998 | Casselman |
| 5,828,229 A | 10/1998 | Cliff et al. |
| 5,828,858 A | 10/1998 | Athanas et al. |
| 5,838,165 A | 11/1998 | Chatter |
| 5,844,888 A | 12/1998 | Narjjyka |
| 5,848,238 A | 12/1998 | Shimomura et al. |
| 5,854,918 A | 12/1998 | Baxter |
| 5,859,544 A | 1/1999 | Norman |
| 5,865,239 A | 2/1999 | Carr |
| 5,867,691 A | 2/1999 | Shiraishi |
| 5,867,723 A | 2/1999 | Chin et al. |
| 5,884,075 A | 3/1999 | Hester et al. |
| 5,887,162 A | 3/1999 | Williams et al. |
| 5,889,982 A | 3/1999 | Rodgers et al. |
| 5,892,370 A | 4/1999 | Eaton et al. |
| 5,892,961 A | 4/1999 | Trimberger |
| 5,901,279 A | 5/1999 | Davis, III |
| 5,915,123 A | 6/1999 | Mirsky et al. |
| 5,924,119 A | 7/1999 | Sindhu et al. |
| 5,927,423 A | 7/1999 | Wada et al. |
| 5,933,642 A | 8/1999 | Greenbaum et al. |
| 5,936,424 A | 8/1999 | Young et al. |

| | | |
|---|---|---|
| 5,943,242 A | 8/1999 | Vorbach et al. |
| 5,956,518 A | 9/1999 | DeHon et al. |
| 5,960,200 A * | 9/1999 | Eager et al. ............... 717/147 |
| 5,966,534 A | 10/1999 | Cooke et al. |
| 5,970,254 A | 10/1999 | Cooke et al. |
| 6,011,407 A | 1/2000 | New |
| 6,014,509 A | 1/2000 | Furtek et al. |
| 6,021,490 A | 2/2000 | Vorbach et al. |
| 6,023,564 A | 2/2000 | Trimberger |
| 6,023,742 A | 2/2000 | Ebeling et al. |
| 6,034,538 A | 3/2000 | Abramovici |
| 6,038,650 A | 3/2000 | Vorbach et al. |
| 6,038,656 A | 3/2000 | Cummings et al. |
| 6,047,115 A | 4/2000 | Mohan et al. |
| 6,049,222 A | 4/2000 | Lawman |
| 6,052,773 A | 4/2000 | DeHon et al. |
| 6,054,873 A | 4/2000 | Laramie |
| 6,081,903 A | 6/2000 | Vorbach et al. |
| 6,085,317 A | 7/2000 | Smith |
| 6,088,795 A | 7/2000 | Vorbach et al. |
| 6,092,174 A | 7/2000 | Roussakov |
| 6,105,105 A | 8/2000 | Trimberger et al. |
| 6,108,760 A | 8/2000 | Mirsky et al. |
| 6,119,181 A | 9/2000 | Vorbach et al. |
| 6,122,719 A | 9/2000 | Mirsky et al. |
| 6,125,408 A | 9/2000 | McGee et al. |
| 6,127,908 A | 10/2000 | Bozler et al. |
| 6,172,520 B1 | 1/2001 | Lawman et al. |
| 6,202,182 B1 | 3/2001 | Abramovici et al. |
| 6,216,223 B1 * | 4/2001 | Revilla et al. ............. 712/245 |
| 6,219,833 B1 * | 4/2001 | Solomon et al. ............ 717/149 |
| 6,243,808 B1 | 6/2001 | Wang |
| 6,260,179 B1 | 7/2001 | Ohsawa et al. |
| 6,263,430 B1 | 7/2001 | Trimberger et al. |
| 6,279,077 B1 | 8/2001 | Nasserbakht et al. |
| 6,282,627 B1 | 8/2001 | Wong et al. |
| 6,286,134 B1 * | 9/2001 | Click, Jr. et al. ........... 717/138 |
| 6,288,566 B1 | 9/2001 | Hanrahan et al. |
| 6,289,440 B1 | 9/2001 | Casselman |
| 6,298,472 B1 | 10/2001 | Phillips et al. |
| 6,311,200 B1 | 10/2001 | Hanrahan et al. |
| 6,321,366 B1 | 11/2001 | Tseng et al. |
| 6,338,106 B1 | 1/2002 | Vorbach et al. |
| 6,341,318 B1 | 1/2002 | Dakhil |
| 6,347,346 B1 | 2/2002 | Taylor |
| 6,349,346 B1 | 2/2002 | Hanrahan et al. |
| 6,370,596 B1 | 4/2002 | Dakhil |
| 6,378,068 B1 | 4/2002 | Foster et al. |
| 6,389,379 B1 | 5/2002 | Lin et al. |
| 6,389,579 B1 | 5/2002 | Phillips et al. |
| 6,392,912 B1 | 5/2002 | Hanrahan et al. |
| 6,405,299 B1 | 6/2002 | Vorbach et al. |
| 6,421,817 B1 | 7/2002 | Mohan et al. |
| 6,425,068 B1 | 7/2002 | Vorbach et al. |
| 6,457,116 B1 | 9/2002 | Mirsky et al. |
| 6,477,643 B1 | 11/2002 | Vorbach et al. |
| 6,480,937 B1 | 11/2002 | Vorbach et al. |
| 6,480,954 B2 | 11/2002 | Trimberger et al. |
| 6,513,077 B2 | 1/2003 | Vorbach et al. |
| 6,519,674 B1 | 2/2003 | Lam et al. |
| 6,526,520 B1 | 2/2003 | Vorbach et al. |
| 6,538,468 B1 | 3/2003 | Moore |
| 6,539,477 B1 | 3/2003 | Seawright |
| 6,542,998 B1 | 4/2003 | Vorbach et al. |
| 6,571,381 B1 | 5/2003 | Vorbach et al. |
| 6,657,457 B1 | 12/2003 | Hanrahan et al. |
| 6,687,788 B2 | 2/2004 | Vorbach et al. |
| 6,697,979 B1 | 2/2004 | Vorbach et al. |
| 6,782,445 B1 * | 8/2004 | Olgiati et al. ............. 711/100 |
| 6,836,839 B2 * | 12/2004 | Master et al. ............. 712/29 |
| 6,883,084 B1 * | 4/2005 | Donohoe ................. 712/1 |
| 6,895,452 B1 * | 5/2005 | Coleman et al. ........... 710/22 |
| 2002/0038414 A1 | 3/2002 | Taylor et al. |
| 2002/0143505 A1 | 10/2002 | Drusinsky |
| 2002/0144229 A1 | 10/2002 | Hanrahan |
| 2002/0165886 A1 | 11/2002 | Lam |
| 2003/0014743 A1 | 1/2003 | Cooke et al. |
| 2003/0046607 A1 | 3/2003 | Vorbach |
| 2003/0052711 A1 | 3/2003 | Taylor et al. |
| 2003/0055861 A1 | 3/2003 | Lai et al. |
| 2003/0056085 A1 | 3/2003 | Vorbach |
| 2003/0056091 A1 | 3/2003 | Greenberg |
| 2003/0056202 A1 | 3/2003 | Vorbach |
| 2003/0093662 A1 | 5/2003 | Vorbach et al. |
| 2003/0097513 A1 | 5/2003 | Vorbach et al. |
| 2003/0123579 A1 | 7/2003 | Safavi et al. |
| 2003/0135686 A1 | 7/2003 | Vorbach et al. |
| 2004/0015899 A1 | 1/2004 | May et al. |
| 2004/0025005 A1 | 2/2004 | Vorbach et al. |

FOREIGN PATENT DOCUMENTS

| | | |
|---|---|---|
| DE | 44 16 881 | 11/1994 |
| DE | 196 51 075 | 6/1998 |
| DE | 196 54 593 | 7/1998 |
| DE | 196 54 595 | 7/1998 |
| DE | 196 54 846 | 7/1998 |
| DE | 197 04 044 | 8/1998 |
| DE | 197 04 728 | 8/1998 |
| DE | 197 04 742 | 9/1998 |
| DE | 198 07 872 | 8/1999 |
| DE | 198 61 088 | 2/2000 |
| DE | 199 26 538 | 12/2000 |
| DE | 100 28 397 | 12/2001 |
| DE | 100 36 627 | 2/2002 |
| DE | 101 29 237 | 4/2002 |
| DE | 102 04 044 | 8/2003 |
| EP | 0 221 360 | 5/1987 |
| EP | 0 428 327 | 5/1991 |
| EP | 0 477 809 | 4/1992 |
| EP | 0 539 595 | 5/1993 |
| EP | 0 628 917 | 12/1994 |
| EP | 0 678 985 | 10/1995 |
| EP | 0 686 915 | 12/1995 |
| EP | 0 707 269 | 4/1996 |
| EP | 0 735 685 | 10/1996 |
| EP | 0 835 685 | 10/1996 |
| EP | 0 748 051 | 12/1996 |
| EP | 0 726 532 | 7/1998 |
| EP | 0 926 594 | 6/1999 |
| EP | 1 102 674 | 7/1999 |
| EP | 1 146 432 | 10/2001 |
| WO | WO 90/04835 | 5/1990 |
| WO | WO90/11648 | 10/1990 |
| WO | WO93/11503 | 6/1993 |
| WO | WO94/08399 | 4/1994 |
| WO | WO95/00161 | 1/1995 |
| WO | WO95/26001 | 9/1995 |
| WO | WO98/26356 | 6/1998 |
| WO | WO98/28697 | 7/1998 |
| WO | WO98/29952 | 7/1998 |
| WO | WO98/31102 | 7/1998 |
| WO | WO98/35299 | 8/1998 |
| WO | WO99/32975 | 7/1999 |
| WO | WO99/40522 | 8/1999 |
| WO | WO99/44120 | 9/1999 |
| WO | WO99/44147 | 9/1999 |
| WO | WO00/17771 | 3/2000 |
| WO | WO00/77652 | 12/2000 |
| WO | WO02/13000 | 2/2002 |
| WO | WO02/21010 | 3/2002 |
| WO | WO02/29600 | 4/2002 |
| WO | WO02/71248 | 9/2002 |
| WO | WO02/71249 | 9/2002 |
| WO | WO02/103532 | 12/2002 |
| WO | WO03/17095 | 2/2003 |

| | | |
|---|---|---|
| WO | WO03/23616 | 3/2003 |
| WO | WO03/25781 | 3/2003 |
| WO | WO03/32975 | 4/2003 |
| WO | WO03/36507 | 5/2003 |

OTHER PUBLICATIONS

Ade et al., "Minimum Memory Buffers in DSP Applications," Electronics Letters, vol. 30, No. 6, Mar. 17, 1994, pp. 469-471.
Villasenor, John et al., "Configurable Computing," Scientific American, vol. 276, No. 6, Jun. 1997, pp. 66-71.
Villasenor, John et al., "Configurable Computing Solutions for Automatic Target Recognition," IEEE, 1996 pp. 70-79.
Tau, Edward et al., "A First Generation DPGA Implementation," FPD'95, pp. 138-143.
Athanas, Peter et al., "Quantitative analysis of floating point arithmetic on FPGA based custom computing machines," IEEE Symposium on FPGAs For Custom Computing Machines, IEEE Computer Society Press, Apr. 19-21, 1995, pp. i-vii, 1-222.
Athanas, Peter et al., "An Adaptive Hardware Machine Architecture and Compiler for Dynamic Processor Reconfiguration", IEEE, Laboratory for Engineering Man/Machine Systems Division of Engineering, Box D, Brown University Providence, Rhode Island, 1991, pp. 397-400.
Bittner, Ray A. Jr., "Wormhole Run-time Reconfiguration: Conceptualization and VLSI Design of a High Performance Computing System," Dissertation, Jan. 23, 1997, pp. I-XX, 1-415.
Myers, G. "Advances in Computer Architecture," Wiley-Interscience Publication, 2nd ed., John Wiley & Sons, Inc. pp. 463-494, 1978.
M. Saleeba, "A Self-Contained Dynamically Reconfigurable Processor Architecture," Sixteenth Australian Computer Science Conference, ASCS-16, QLD, Australia, Feb. 1993.
M. Morris Mano, "Digital Design," by Prentice Hall, Inc., Englewood Cliffs, New Jersey 07632, 1984, pp. 119-125, 154-161.
Maxfield, C. "Logic that Mutates While-U-Wait" EDN (Bur. Ed) (USA), EDN (European Edition), Nov. 7, 1996, Cahners Publishing, USA.
Norman, Richard S., "Hyperchip Business Summary, The Opportunity," Jan. 31, 2000, pp. 1-3.
Ferrante J. et al., "The Program Dependence Graph and its Use in Optimization ACM Transactions on Programming Languages and Systems," Jul. 1987, USA, [online] Bd. 9, Nr., 3, pp. 319-349, XP002156651 ISSN: 0164-0935 ACM Digital Library.
Hwang L. et al., "Min-cut Replication in Partitioned Networks" IEEE Transactions on Computer-Aided Design of Integrated Circuits and Systems, [online] Bd. 14, Nr. 1, Jan. 1995, pp. 96-106, XP00053228 USA ISSN: 0278-0070 IEEE Xplore.
Baumgarte, V., et al., PACT XPP "A Self-reconfigurable Data Processing Architecture," PACT Info. GMBH, Munchen Germany 2001.
Jantsch, Axel et al., "A Case Study on Hardware/software Partitioning," Royal Institute of Technology, Kista, Sweden, Apr. 10, 1994 IEEE, pp. 111-118.
Becker, J. et al., "Parallelization in Co-compilation for Configurable Accelerators—a Host/accelerator Partitioning Compilation Method," proceedings of Asia and South Pacific Design Automation Conference, Yokohama, Japan, Feb. 10-13, 1998.
Isshiki, Tsuyoshi et al., "Bit-Serial Pipeline Synthesis for Multi-FPGA Systems with C++ Design Capture," 1996 IEEE, pp. 38-47.
Weinhardt, Markus, "Ubersetzingsmethoden fur strukturprogrammierbare rechner ," Dissertation for Doktors der Ingenieurwissenschaften der Universitat Karlsruhe: Jul. 1, 1997.
Hammes, Jeff et al., "Cameron: High Level Language Compilation for Reconfigurable Systems," Department of Computer Science, Colorado State University, Conference on Parallel Architectures and Compilation Techniques, Oct. 12-16, 1999.
K. Wada et al., "A Performance Evaluation of Tree-based Coherent Distributed Shared Memory" Proceedings of the Pacific RIM Conference on Communications, Comput and Signal Processing, Victoria, May 19-21, 1993.

Nilsson et al., "The Scalable Tree Protocol—A Cache Coherence Approaches for Large-Scale Multiprocessors" IEEE, pp. 498-506 Dec. 1992.
Wu et al., "A New Cache Directory Scheme", IEEE, pp. 466-472, Jun. 1996.
Hauck "The Roles of FPGA's in Reprogrammable Systems," IEEE Apr. 1998, pp. 615-638.
Wittig et al., "OneChip: An FPGA Processor with Reconfigurable Logic" IEEE, 1996 pp. 126-135.
Cadambi et al., "Managing Pipeline-reconfigurable FPGAs," ACM, 1998, pp. 55-64.
Hong Yu Xu et al., "Parallel QR Factorization on a Block Data Flow Architecture" Conference Proceeding Article, Mar. 1, 1992, pp. 332-336 XP010255276, p. 333, Abstract 2.2, 2.3, 2.4—p. 334.
Mirsky, E. DeHon, "MATRIX: A Reconfigurable Computing Architecture with Configurable Instruction Distribution and Deployable Resources," Proceedings of the IEEE Symposium on FPGAs for Custom Computing Machines, 1996, pp. 157-1666.
Weinhardt, M. "Compilation Methods for Structure-programmable Computers", dissertation, ISBN 3-89722-011-3, 1997.
Cardoso, J.M.P., "Compilation of Java™ Algorithms onto Reconfigurable Computing Systems with Exploitation of Operation-Level Parallelism," Ph.D. Thesis, Universidade Tecnica de Lisboa (UTL), Lisbon, Portugal Oct. 2000 (English Abstract included).
Kung, "Deadlock Avoidance for Systolic Communication", 1988 Conference Proceedings of 15th Annual International Symposium on Computer Architecture, May 30, 1988, pp. 252-260.
TMS320C54X DSP: CPU and Peripherals, Texas Instruments, 1996, pp. 6-26 to 6-46.
TMS320C54x DSP: Mnemonic Instruction Set, Texas Instruments, 1996, p. 4-64.
XLINX, "Logic Cell Array Families: XC4000, XC4000A and XC4000H", product description, pp. 2-7 to 2-15, Additional XC3000, XC31000 and XC3100A Data, pp. 8-16 and 9-14.
Miller, Michael J. et al., "High-Speed FIFOs Contend with Widely Differing Data Rates: Dual-port RAM Buffer and Dual-pointer System Provide Rapid, High-density Data Storage and Reduce Overhead", Computer Design, Sep. 1, 1985, pp. 83-86.
Forstner, Peter "Wer Zuerst Kommt, Mahlt Zuerst!: Teil 3: Einsatzgebiete und Anwendungsbeispiele von FIFO-Speichern", Elektronik, Aug. 2000, pp. 104-109.
John R. Hauser et al., "Garp: A MIPS Processor with a Reconfigurable Coprocessor", University of California, Berkeley, IEEE, 1997, pp. 12-21.
Jorg Donandt, "Improving Response Time of Programmable Logic Controllers by Use of a Boolean Coprocessor", AEG Research Institute Berlin, IEEE, 1989, pp. 4-167-4-169.
Alexandre F. Tenca et al., "A Variable Long-Precision Arithmetic Unit Design for Reconfigurable Coprocessor Architectures", University of California, Los Angeles, 1998, pp. 216-225.
Andreas Koch et al, "Practical Experiences with the SPARXIL Co-Processor", 1998, IEEE, pp. 394-398.
Gokhale M. B. et al., "Automatic Allocation of Arrays to Memories in FPGA processors with Multiple Memory Banks", Field-Programmable Custom Computing Machines, 1999, IEEE, pp. 63-67.
Christian Siemers, "Rechenfabrik Ansaetze Fuer Extrem Parallele Prozessoren", Verlag Heinze Heise GmbH., Hannover, DE No. 15, Jul. 16, 2001, pp. 170-179.
Pedro Diniz et al., "Automatic Synthesis of Data Storage and Control Structures for FPGA-based Computing Engines", 2000, IEEE, pp. 91-100.
Markus Weinhardt et al., "Pipeline Vectorization for Reconfigurable Systems", 1999, IEEE, pp. 52-60.
Lizy John et al., "A Dynamically Reconfigurable Interconnect for Array Processors", vol. 6, No. 1, Mar. 1998, IEEE, pp. 150-157.
Fineberg, Samuel et al., "Experimental Analysis of a Mixed-Mode Parallel Architecture Using Bitonic Sequence Sorting", vol. 11, No. 3, Mar. 1991, pp. 239-251.
Jacob, Jeffrey et al., "Memory Interfacing and Instruction Specification for Reconfigurable Processors", ACM 1999, pp. 145-154.

* cited by examiner $$VEC = \frac{n_{data}}{n_{nodes}}$$

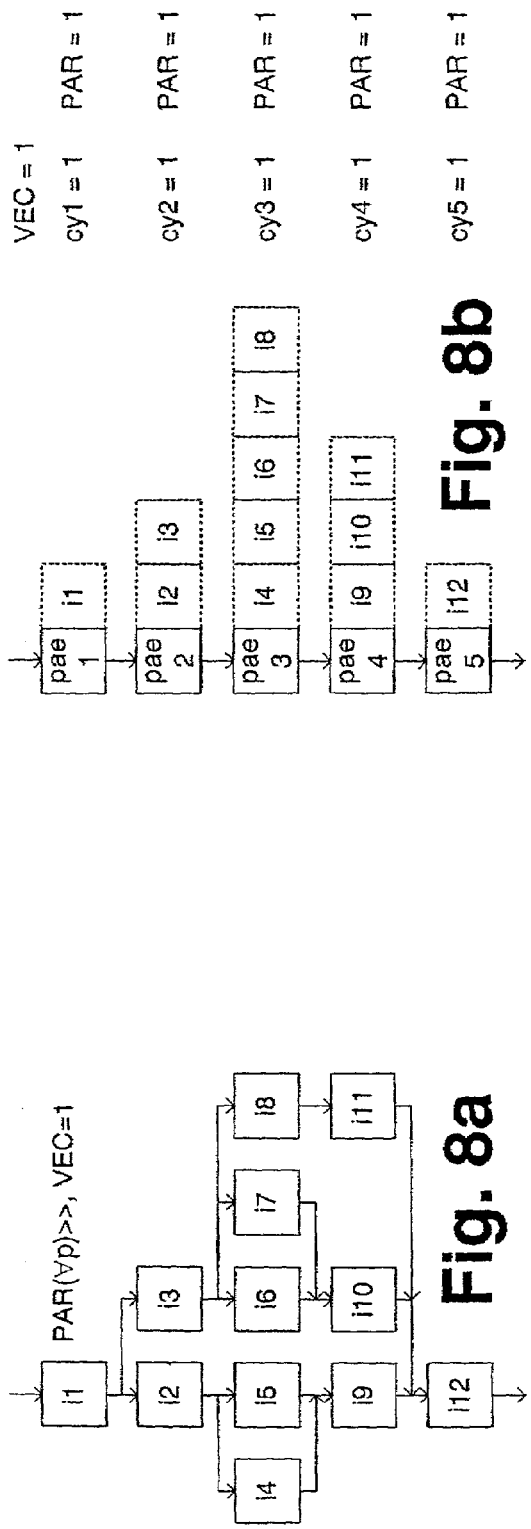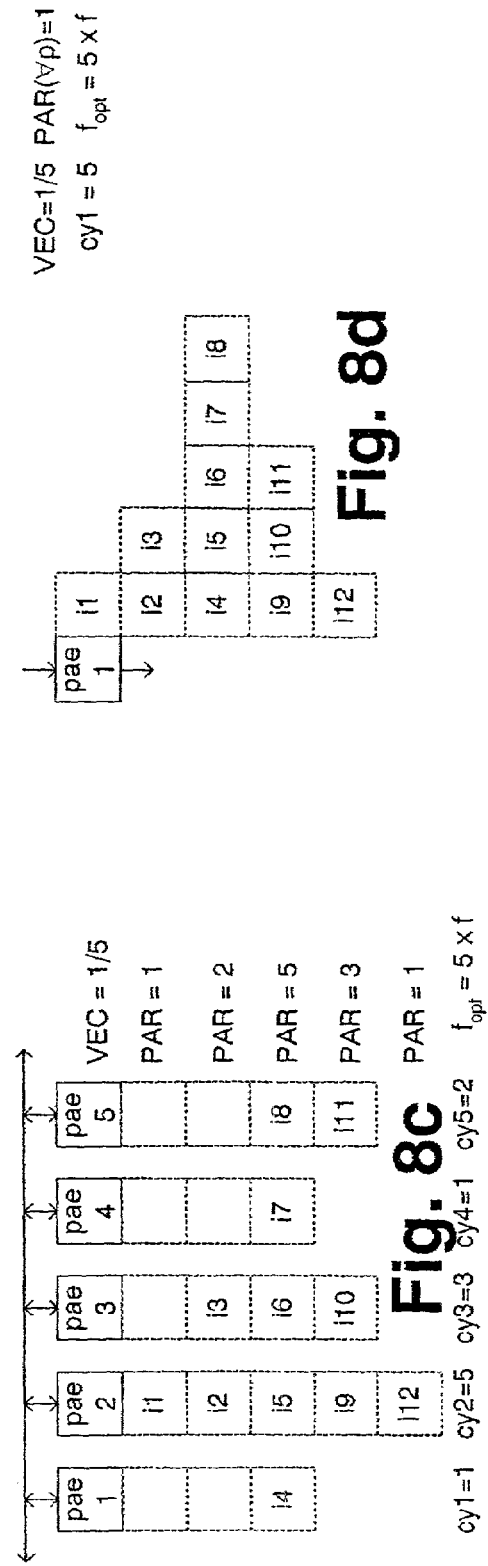
Fig. 8a
Fig. 8b
Fig. 8c
Fig. 8d

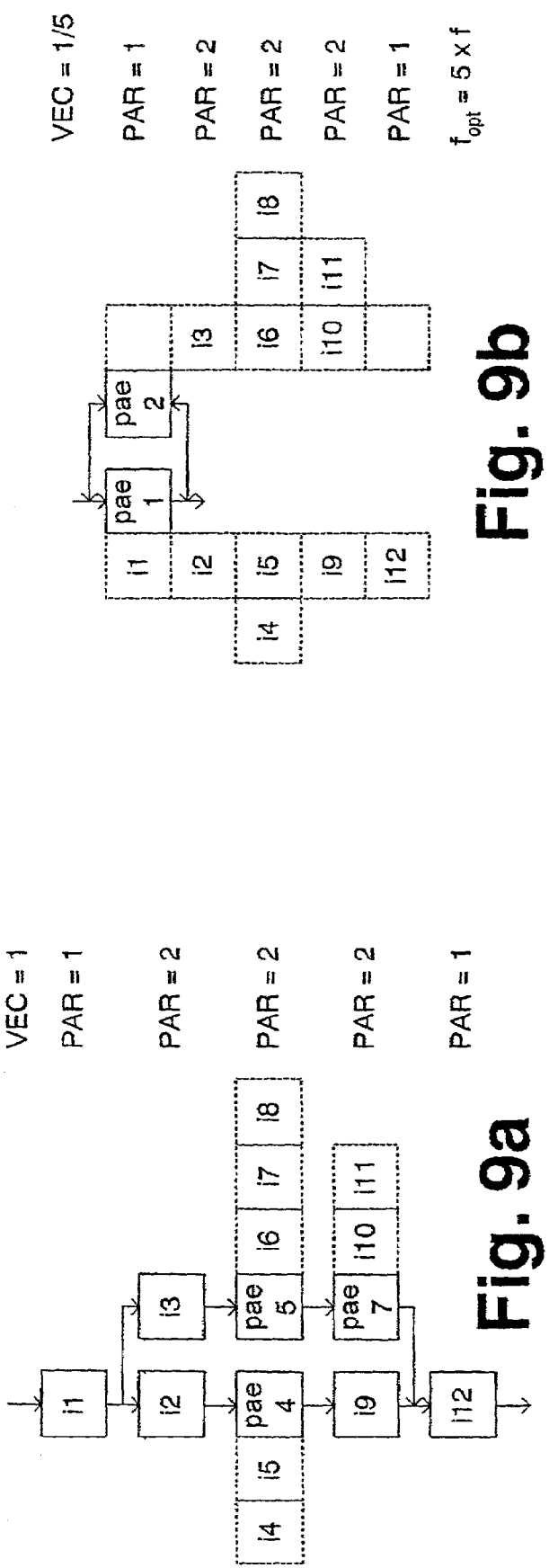

METHOD FOR TRANSLATING PROGRAMS FOR RECONFIGURABLE ARCHITECTURES

FIELD OF THE INVENTION

The present invention relates to a method for translating programs for reconfigurable architectures.

BACKGROUND INFORMATION

Conventional paralleling compilers normally use special constructs such as semaphores and/or other methods for synchronization. Conventionally, technology-related methods are used. Conventional methods are not suitable for combining functionally specified architectures with the associated time response and imperatively specified algorithm. The methods used will, therefore, supply satisfactory solutions only in special cases.

Compilers for reconfigurable architectures conventionally use macros which have been specially generated for the particular reconfigurable hardware, hardware description languages (e.g. Verilog, VHDL, and System-C) being used in most cases for generating the macros. These macros are then called up (instanced) out of the program flow by a normal high-level language (e.g. C, C++).

SUMMARY

The present invention relates to a method for automatically mapping functionally or imperatively formulated computing rules onto different target technologies, for example, onto ASICs, reconfigurable chips (FPGAs, DPGAs, VPUs, ChessArray, KressArray, Chameleon, etc.; combined under the term VPU in the text which follows), sequential processors (CISC/RISC CPUs, DSPs, etc.; combined under the term CPU in the text which follows) and parallel processor systems (SMP, MMP, etc.). In this connection, particular reference is made to the following: P 44 16 881.0-53, DE 197 81 412.3, DE 197 81 483.2, DE 196 54 846.2-53, DE 196 54 593.5-53, DE 197 04 044.6-53, DE 198 80 129.7, DE 198 61 088.2-53, DE 199 80 312.9, PCT/DE 00/01869, DE 100 36 627.9-33, DE 100 28 397.7, DE 101 10 530.4, DE 101 11 014.6, PCT/EP 00/10516, EP 01 102 674.7, U.S. Ser. No. 10/009,649 (PACT13), (PACT17), (PACT18), (PACT22), (PACT24), (PACT25), U.S. Ser. No. 60/317,876 (PACT26US), U.S. Pat. No. 6,425,068 B1 (PACT02), U.S. Pat. No. 6,088,795 (PACT04), U.S. Pat. No. 6,081,903 (PACT08), U.S. Ser. No. 09/623,052 (PACT10), each of which is expressly incorporated herein by reference in its entirety.

VPUs basically may include a multidimensional homogeneous or inhomogeneous flat or hierarchical arrangement (PA) of cells (PAEs) which may perform arbitrary functions, particularly logical and/or arithmetic functions and/or storage functions and/or network functions. The PAEs are associated with a loading unit (CT) which determines the operation of the PAEs by configuration and possibly reconfiguration. The method is based on an abstract parallel machine model which, apart from the finite automaton, also integrates imperative problem specifications and provides for an efficient algorithmic derivation of an implementation to different technologies.

BRIEF DESCRIPTION OF THE DRAWINGS

FIGS. 4, 4a and 4b illustrate implementations of loops.

FIG. 8a illustrates the mapping of the graph of FIG. 7a onto a group of PAEs with maximum achievable parallelism.

FIG. 8b illustrates the graph of FIG. 7a with a maximum usable vectorizability.

FIG. 8c illustrates the graph of FIG. 7a with a high PAR(p).

FIG. 8d illustrates the graph of FIG. 7a for the case where there is no usable parallelism.

FIG. 9a illustrates the function according to FIG. 7a in which the paths (i2∧(i4∨i5) ∧i9) and (i3∧(i6∨i7∨i8)∧(i10∨i11)) may be executed in parallel.

FIG. 9b illustrates the function according to FIG. 7a in which the paths (i1∧i2∧(i4∨i5)∧i9∧i12) and (i3∧(i6∨i7∨i8)∧(i10∨i11) are in parallel.

DETAILED DESCRIPTION

Conventionally, the basis for working through virtually any method for specifying algorithms is the finite automaton. FIG. 1 illustrates the structure of a finite automaton. A simple finite automaton may be divided into a combinational network and a register stage for temporarily storing data between the individual data processing cycles.

Figure 2:
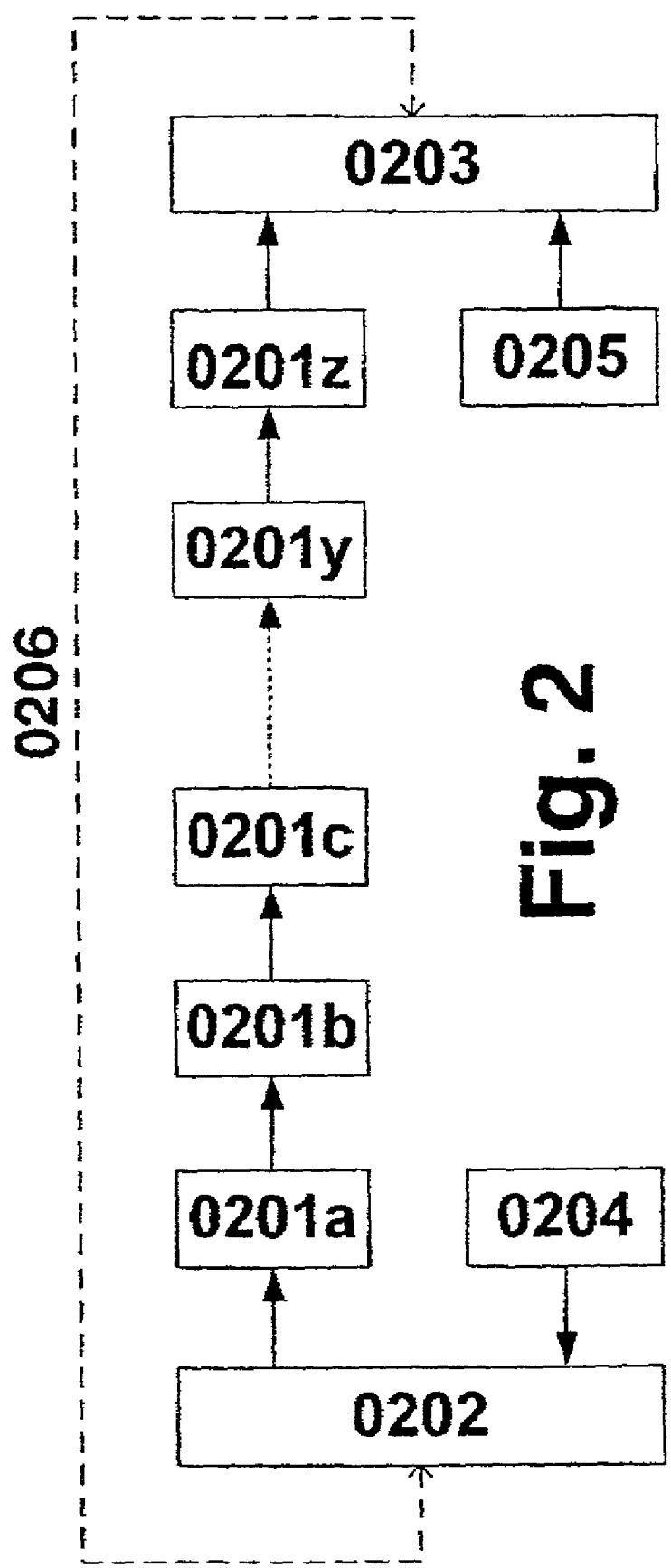
FIG. 2 illustrates a mapping of a finite automaton to a reconfigurable architecture.

The finite automaton makes it possible to map complex algorithms onto any sequential machines as illustrated in FIG. 2. The complex finite automaton illustrated includes a complex combinational network, a memory for storing data, and an address generator for addressing the data in the memory.

In principle, any sequential program may be interpreted as a finite automaton and in most cases a very large combinational network is produced. For this reason, the combinational operations in the programming of traditional "von Neumann" architectures—i.e., in all CPUs—are split into a sequence of in each case individual simple predetermined operations (OpCodes) in registers in the CPU. This splitting results in states for controlling the combinational operation split into a sequence, which states do not exist or are not needed within the original combinational operation. The states of a von Neumann machine to be processed may be distinguished in principle, therefore, from the algorithmic states of a combinational network, i.e., the registers of finite automatons.

In contrast to the rigid OpCodes of CPUs, the VPU technology provides for the flexible configuration of complex combinational operations (complex instruction) in accordance with the algorithm to be mapped. The VPU technology is described in the following documents, each of which is incorporated herein by reference in its entirety: U.S. Pat. No. 5,943,242 (PACT01), U.S. Pat. No. 6,425,068 B1 (PACT02), U.S. Pat. No. 6,119,181 (PACT03), U.S. Pat. No. 6,088,795 (PACT04), U.S. Pat. No. 6,021,490 (PACT05), U.S. Pat. No. 6,081,903 (PACT08), U.S. Ser. No. 09/623,052 (PACT10), U.S. Ser. No. 10/009,649 (PACT13), German Patent Application No. 100 28 397.7 (PACT17), German Patent Application No. 101 10 530.4 (PACT18), German Patent Application No. 100 50 442.6 (PACT22), European Patent Application No. 01 102 674.7 (PACT24).

Operation of the Compiler

It is furthermore an operation of the compiler to generate the complex instructions in such a manner that it may be executed for as long as possible in the PAE matrix without reconfiguration.

The compiler also generates the finite automaton from the imperative source text in such a manner that it may be executed optimally in the PAE matrix.

The finite automaton may be split into configurations.

The processing (interpreting) of the finite automaton may be done in a VPU in such a manner that the configurations generated may be progressively mapped to the PAE matrix and the operating data and/or states, which may need to be transmitted between the configurations, may be stored in the memory. For this purpose, the method described in U.S. Pat. No. 6,088,795 (PACT04) or, respectively, the corresponding architecture may be used.

In other words, a configuration represents a plurality of instructions; a configuration determines the operation of the PAE matrix for a multiplicity of clock cycles during which a multiplicity of data is processed in the matrix; these originate from a source external to the VPU and/or an internal memory and may be written to an external source and/or to an internal memory. The internal memories replace the set of registers of a conventional CPU in such a manner that, e.g., a register may be represented by a memory and, according to the operating principle of the VPU technology, it is not a data word which is stored per register but an entire data record per memory.

The data and/or states of the processing of a configuration being executed are stored in the memories and are thus available for the next configuration executed.

A difference from compilers paralleling on an instruction basis consists in that the method emulates a combinational network on a PAE matrix whereas conventional compilers combine sequences of instructions (OpCodes).

Exemplary WHILE Language

In the text that follows, the operation of the compiler is illustrated by way of an example in accordance with a simple language. The principles of this language are described in the "Armin Nückel thesis." However, this only describes the mapping of a function to a static combinational network. An aspect of the present invention is the mapping to configurations which are then mapped to the PAE matrix in a temporal sequence in accordance with the algorithm and the states resulting during the processing.

The "WHILE" programming language is defined as follows:

Syntax: WHILE . . .
Constructs: Instruction
Sequence of instructions
Loop

Instructions

An instruction or a sequence of instructions may be mapped to a combinational network by the compiler method described.

Figure 3A:
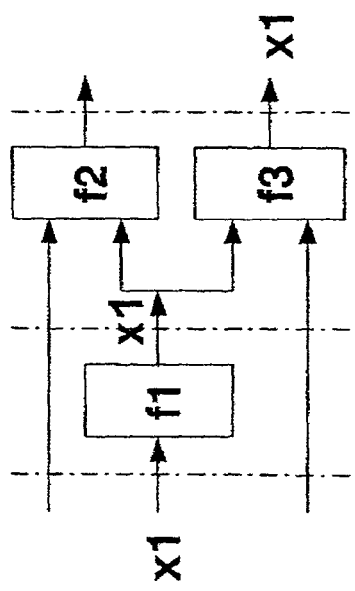
FIG. 3a illustrates a combinational network with the associated variables.

FIG. 3a illustrates a combinational network with the associated variables. The content of one and the same variable (e.g. x1) may change from one stage (0301) of the network to the next (0302).

Figure 3B:
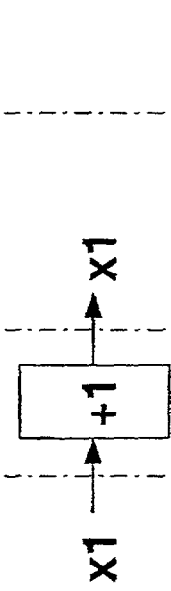
FIG. 3b illustrates a combinational network with the associated variables, where x1:=x1+1.

This change is illustrated by way of example for the assignment x1: =x1+1 in FIG. 3b.

Addressing of Variables

Figure 3C:
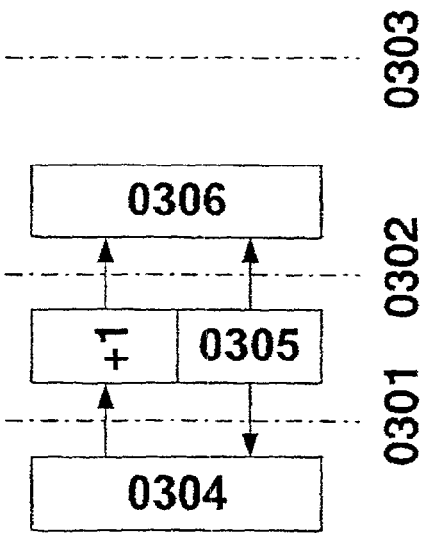
FIG. 3c illustrates the behavior of a finite automaton calculating x1:=x1+1 within a configuration.

For the purpose of addressing for reading the operands and for storing the results, address generators may be synchronized with the combinational network of the assignment. With each variable processed, corresponding new addresses may be generated for operands and results (FIG. 3c). In principle, the address generator may be of any type and depends on the addressing schemes of the compiled application. For operands and results, common, combined, or completely independent address generators may be implemented.

Since typically a plurality of data are processed within a certain configuration of the PAEs in the present data processing model, simple FIFO modes are available for most applications, at least for the data memories, which are used for storing data and states of the data processing (virtually as replacement of a conventional set of registers of conventional CPUs) within this description (compare U.S. Pat. No. 6,088,795 (PACT04)).

Sequences of Instructions

A sequence of the exemplary assignment may be generated as follows (FIG. 4a):

x1:=0;
WHILE TRUE DO
x1:=x1+1;

This sequence may now be mapped in accordance with an assignment, as described above, and address generators for operands and results.

Finite Sequences

Figure 5B:
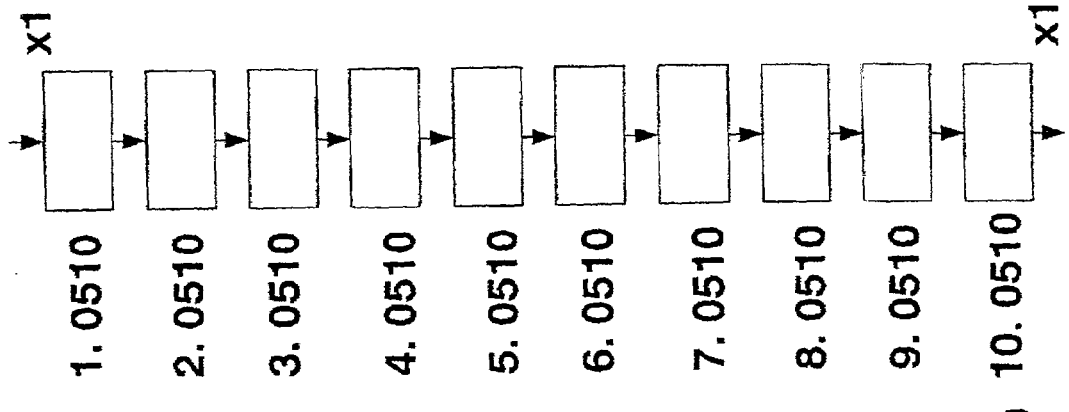
FIG. 5b illustrates an iterative calculation for i:=1 to 10, x1;=x1*x1.
Figure 5A:
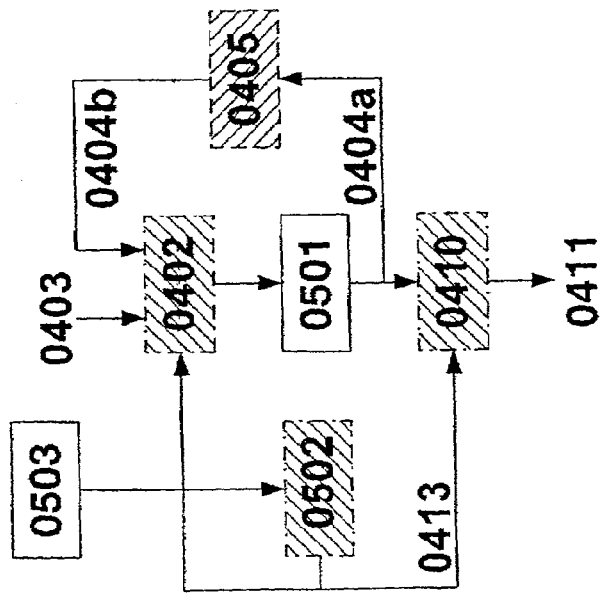
FIG. 5a illustrates an iterative calculation for i:=1 to 10, x1:=x1*x1.

In the following, a particular example embodiment of sequences from the defined constructs of the WHILE language will be discussed. A finite sequence of the exemplary assignment may be generated as follows:

FOR i:=1 TO 10
x1:=x1+1;

Such a sequence may be implemented by two types:

a) The first type is in accordance with generating an adder for calculating i in accordance with the WHILE construct (above) and a further adder for calculating x1. The sequence is mapped as a loop and calculated iteratively (FIG. 5a).

b) The second type is in accordance with rolling out the loop which dispenses with the calculation of i as a function. The calculation of x1 is instanced i-times and built up as a pipeline which produces i concatenated adders (FIG. 5b).

Conditions

Conditions may be expressed in accordance with WHILE. For example:

x1:=0;
WHILE x1<10 DO
x1:=x1+1;

The mapping generates an additional PAE for processing the comparison. The result of the comparison is represented by a status signal (compare U.S. Pat. No. 6,081,903

(PACT08)) which is evaluated by the PAEs processing the instruction and the address generators.

Figure 4B:
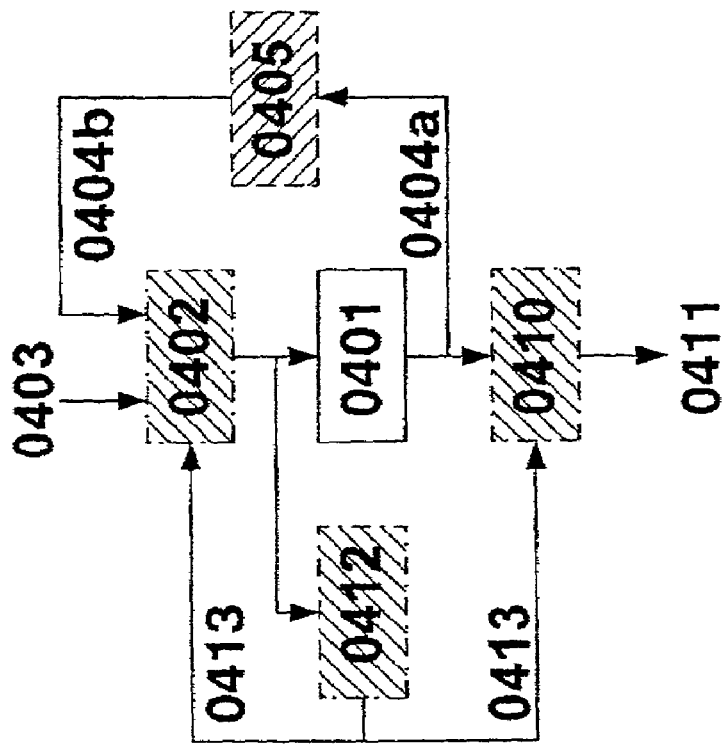

The resultant mapping is illustrated in FIG. 4b. Evaluation of the condition (here WHILE, generally also IF; CASE) generates a status which may be provided to the subsequent data processing U.S. Pat. No. 6,081,903 (PACT08) and/or sent to the CT or a local load control U.S. Pat. No. 6,088,795 (PACT04) which derives from this information on the further program flow and any reconfigurations which may be present U.S. Pat. No. 6,088,795 (PACT04), U.S. Pat. No. 6,021,490 (PACT05), U.S. Ser. No. 09/623,052 (PACT10), U.S. Ser. No. 10/009,649 (PACT13), German Patent Application No. 100 28 397.7 (PACT17).

Basic Method

According to this basic method, each program may be mapped in a system which is built up as follows:

1. Memory for operands

2. Memory for results

3. Address generator(s)

4. Network of a) assignments and/or b) While instructions.

Handling States

A distinction is made between algorithmically relevant and irrelevant states. Relevant states are necessary within the algorithm for describing its correct operation. They are essential to the algorithm. Irrelevant states are produced by the hardware used and/or by the selected mapping or from other secondary reasons. They are essential for the mapping (i.e., hardware).

It is only the relevant states which may need to be obtained with the data. For this reason, they are stored together with the data in the memories since they occurred either as a result of the processing with the data or are necessary as operands with the data for the next processing cycle.

In contrast, irrelevant states are necessary only locally and locally in time and do not, therefore, need to be stored.

EXAMPLES a) The state information of a comparison is relevant for the further processing of the data since it determines the functions to be executed.

b) Assume a sequential divider is produced, for example, by mapping a division instruction to hardware which only supports the sequential division. This results in a state which identifies the mathematical step within the division. This state is irrelevant since only the result (i.e., the division carried out) is required for the algorithm. In this case, only the result and the time information (i.e., the availability) are thus needed.

The time information may be obtained by the RDY/ACK handshake, for example in the VPU technology described in U.S. Pat. No. 5,943,242 (PACT01), U.S. Pat. No. 6,425,068 B1 (PACT02), and U.S. Ser. No. 10/009,649 (PACT13). However, it is noted in this regard that the handshake also does not represent a relevant state since it only signals the validity of the data as a result of which the remaining relevant information, in turn, is reduced to the existence of valid data.

Handling Time

In many programming languages, particularly in sequential ones such as C, a precise temporal order is implicitly predetermined by the language, for example, in sequential programming languages by the order of the individual instructions. If required by the programming language and/or the algorithm, the time information may be mapped to synchronization models such as RDY/ACK and/or REQ/ACK or a time stamp method described in German Patent Application No. 101 10 530.4 (PACT18).

Macros

More complex functions of a high-level language, such as loops, are implemented by macros. The macros are predetermined by the compiler and instanced at translation time (compare FIG. 4).

The macros are built up either of simple language constructs of the high-level language or at assembler level. Macros may be parameterized in order to provide for a simple adaptation to the algorithm described (compare FIG. 5, 0502).

Feedback Loops and Registers

Undelayed feedbacks which resonate uncontrolled may arise within the mapping of an algorithm into a combinational network.

In VPU technologies described in U.S. Pat. No. 6,425,068 B1 (PACT02), this is prevented by the structure of the exemplary PAE in that at least one register is permanently defined in the PAEs for the purpose of decoupling.

In general, undelayed feedbacks may be detected by analyzing the graph of the combinational network produced. Registers for decoupling are then inserted collectively into the data paths in which an undelayed feedback exists.

The correct operation of the calculation is also ensured by inserting registers by using handshake protocols (e.g., RDY/ACK).

Time Domain Multiplexing (TDM)

In principle, any PAE matrix implemented in practice has only one finite quantity. For this reason, a partitioning of the algorithm according to numeral 4 of the basic method (above) into a plurality of configurations which are successively configured may need to be performed in the subsequent step. The aim is to calculate as many data packets as possible in the network without having to reconfigure.

Between the configurations, a buffer memory is introduced which—similar to a register in the case of CPUs—stores the data between the individual configurations executed sequentially.

In other words, in VPU technology, it is not an OpCode which is sequentially executed but complex configurations. Whereas, in the case of CPUs, an OpCode typically processes a data word, a plurality of data words (a data packet) are processed by a configuration in the VPU technology. As a result, the efficiency of the reconfigurable architecture increases due to a better relationship between reconfiguration effort and data processing.

In the VPU technology, a memory may be used instead of a register since it is not data words but data packets which are processed between the configurations. This memory may be constructed as random access memory, stack, FIFO, or any other memory architecture, a FIFO typically providing the best one and the one which is implemented most easily.

Data are then processed by the PAE matrix in accordance with the algorithm configured and stored in one or more memories. The PAE matrix is reconfigured after the processing of a set of data and the new configuration takes the intermediate results from the memory(ies) and continues the execution of the program. In the process, new data may also easily flow additionally into the calculation from external memories and/or to the peripherals, and results may likewise be written to external memories and/or to the peripherals.

In other words, the typical sequence of data processing is the reading out of internal RAMs, the processing of the data in the matrix, and writing the data into the internal memories; arbitrary external sources may be easily used for data processing or destinations used for data transfers in addition to or instead of internal memories.

Whereas "sequencing" in CPUs is defined as the reloading of an OpCode, "sequencing" of VPUs is defined as the (re)configuring of configurations.

The information regarding when and/or how sequencing takes place (i.e., which is the next configuration that should be configured) may be represented by various information items which may be used individually or in combination. For example, the following strategies are appropriate for deriving the information:

a) defined by the compiler at translation time, b) defined by the event network (Trigger, U.S. Pat. No. 6,081,903 (PACT08)), c) defined by the fill ratio of the memories (Trigger, U.S. Pat. No. 6,081,903 (PACT08), U.S. Pat. No. 6,088,795 (PACT 04)).

Influence of the TDM on the Processor Model

The partitioning of the algorithm decisively determines the relevant states which are stored in the memories between the various configurations. If a state is only relevant within a configuration (locally relevant state), it is not necessary to store it.

Nevertheless, it is useful to store these states for the purpose of debugging of the program to be executed in order to provide the debugger with access to these states. This necessity is described in greater detail in the debugging method U.S. Ser. No. 09/967,497 (PACT21) at the same date. Furthermore, states may become relevant additionally if a task switch mechanism is used (e.g. by an operating system or interrupt sources) and current configurations executed are interrupted, other configurations are loaded and the aborted configuration is to be continued at a later time. A more detailed description follows.

A simple example follows to illustrate the discriminating feature for locally relevant states:

a) A branch of the type "if ( ) then . . . else . . ." may fit completely into a single configuration, i.e., both data paths (branches) are mapped completely within the configuration. The state resulting from a comparison is relevant but local since it is no longer needed in the subsequent configurations.

b) The same branching may be too large to fit completely into a single configuration. A number of configurations may be necessary for mapping the complete data paths. In this case, the state is globally relevant and may need to be stored and allocated to the respective data since the subsequent configurations may need the respective state of the comparison during the further processing of the data.

Task Switching

The possible use of an operating system may have an additional influence on the observation and handling of states. Operating systems may use, for example, task schedulers for administering a number of tasks in order to provide multitasking.

Task schedulers terminate tasks at a particular time, start other tasks and return to the further processing of the aborted task after the other ones have been processed. If it is ensured that a configuration, which corresponds to the processing of a task, terminates only after the complete processing, i.e., when all data and states to be processed within this configuration cycle are stored, locally relevant states may remain unstored.

If, however, the task scheduler terminates configurations before they have been completely processed, local states and/or data may need to be stored. Furthermore, this may be of advantage if the processing time of a configuration cannot be predicted. This also appears useful in conjunction with the holding problem and the risk that a configuration will not terminate (e.g. due to a fault) in order to prevent a deadlock of the entire system.

In other words, taking into consideration task switching, relevant states may also need to be considered to be those which are necessary for task switching and for a new correct start of the data processing.

In the case of a task switch, the memory for results and possibly also the memory for the operands may need to be saved and established again at a later time, that is to say on return to this task. This may be done similarly to the PUSH/POP instructions and conventional methods. Furthermore, the state of the data processing may need to be saved, i.e. the pointer to the last operands completely processed. Reference is made here to German Patent Application No. 101 10 530.4 (PACT18).

Depending on the optimization of the task switch, there are two possibilities, for example:

a) The terminated configuration is reconfigured and only the operands are loaded. Data processing begins once again as if the processing of the configuration has not yet been begun at all. In other words, all data calculations are simply executed from the beginning and calculations may already have been performed previously. This possibility is simple but not very efficient.

b) The terminated configuration is reconfigured and the operands and results already calculated have been loaded into the respective memories. The data processing is continued at the operands which have not been completely calculated. This method is more efficient but presupposes that additional states which occur during the processing of the configuration may become relevant, for example at least one pointer to the last operands completely miscalculated may need to be saved so that it is possible to start again with successors after completed reconfiguration.

Algorithmic Optimization

The translation method described separates control structures from algorithmic structures. For example a loop may be split into a body (WHILE) and an algorithmic structure (instructions).

The algorithmic structures may then be optionally optimized by an additional tool following the separation.

For example, a subsequent algebra software may optimize and minimize the programmed algorithms. Such tools are conventional, e.g. by AXIOM, MARBLE, etc. Due to the minimization, a quicker execution of the algorithm and/or a considerably reduced space requirement may be achieved.

The result of the optimization is then conducted back into the compiler and processed further accordingly.

Applicability for Processors

Instead of a PAE matrix, an arrangement of arithmetic logic units (ALUS) such as conventionally used, for example, in VLIW processors and/or an arrangement of complete processors such as conventionally used, for example, in multiprocessor systems, may also be used. The use of an individual ALU represents a special case so that the method may also be used for conventional CPUs.

In the dissertation by Armin Nückel, a method is described which provides for the translation of the WHILE language into semantically correct finite automatons. Beyond that, a finite automaton may be used as a "subroutine" and conversely. This provides the possibility of mapping a configuration to different implementation technologies such as, e.g., CPUs, symmetric multiprocessors, FPGAs, ASICs, VPUs.

In particular, it is possible to allocate in each case optimally suited hardware to parts of an application. In other words, a data flow structure, for example, may be transferred to a data flow architecture whereas a sequential structure may be mapped to a sequencer.

The problems arising with resource allocations for the individual algorithms may be solved, e.g. by the job assignment algorithm for administering the allocation.

The following is a discussion of several exemplary embodiments of the compiler.

Figure 1A:
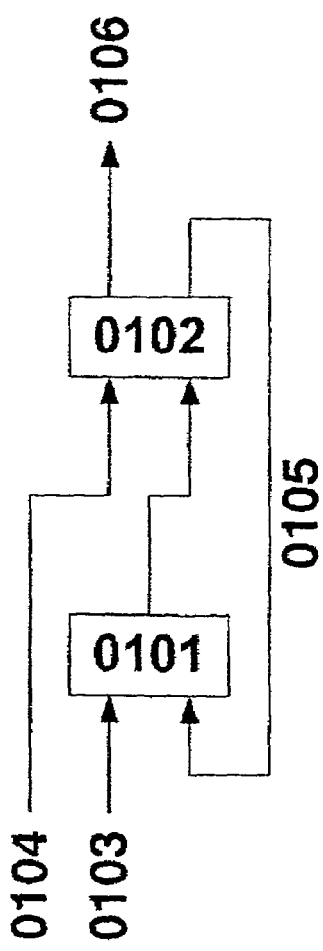
FIG. 1a illustrates the structure of a normal finite automaton in which a combinational network is combined with a register.

FIG. 1a illustrates an example embodiment of the structure of a normal finite automaton in which a combinational network (0101) is combined with a register (0102). Data may be conducted directly to 0101 (0103) and 0102 (0104). By feeding back (0105) the register to the combinational network, a state may be processed in dependence on the previous states. The processing results are represented by 0106.

Figure 1B:
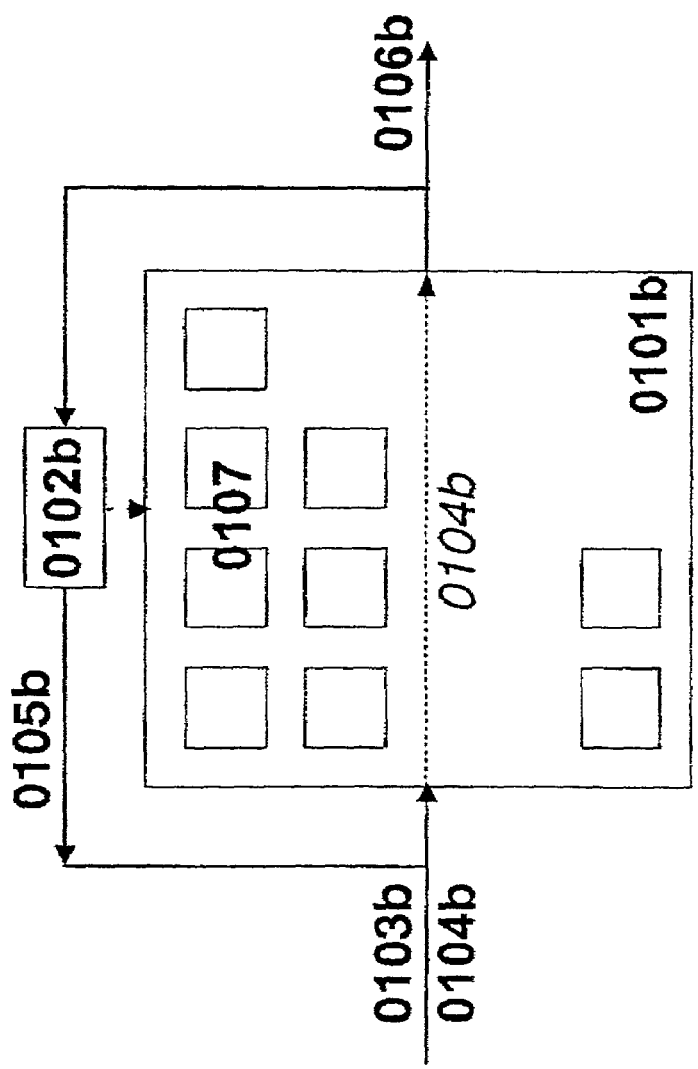
FIG. 1b illustrates a finite automaton by a reconfigurable architecture.

FIG. 1b illustrates an example embodiment of the finite automaton by a reconfigurable architecture according to U.S. Pat. No. 5,943,242 (PACT01) and U.S. Pat. No. 6,088,795 (PACT04) (PACT04 FIGS. 12–15)). The combinational network from FIG. 1a (0101) is replaced by an arrangement of PAEs 0107 (0101b). The register (0102) may be implemented by a memory (0102b) which may store a number of cycles. The feedback according to 0105 may be carried out by 0105b. The inputs (0103b and 0104b, respectively) are equivalent to 0103 and 0104, respectively. The direct access to 0102b may be implemented by a bus through the array 0101b. The output 0106b is again equivalent to 0106.

FIG. 2 illustrates an example embodiment of the mapping of a finite automaton to a reconfigurable architecture. 0201 (x) represent the combinational network (which may be constructed as PAEs according to FIG. 1b). There may be one or more memories for operands (0202) and one or more memories for results (0203). Additional data inputs/outputs according to 0103b, 0104b, 0106b are not illustrated. An address generator (0204, 0205) is in each case allocated to the memories.

The operand and result memories (0202, 0203) are physically or virtually coupled to one another in such a manner that, for example, the results of a function may be used as operands by one another and/or results and operands of a function may be used as operands by one another. Such coupling may be established, for example, by bus systems or by a (re)configuration by which the function and networking of the memories with the 0201 is reconfigured.

FIG. 3 illustrates various aspects for dealing with variables. In FIG. 3a, 0301, 0302, and 0303 illustrate various stages of the calculation. These stages may be purely combinational or also separated from one another via registers. F1, f2, and f3 are functions, and x1 is the variable according to the description of the patent. FIG. 3b illustrates the variable x1 for the function x1:=x1+1.

FIG. 3c illustrates the behavior of a finite automaton calculating x1:=x1+1 within a configuration. In the next configuration, 0306 and 0304 may need to be exchanged in order to obtain a complete finite automaton. 0305 represents the address generators for the memory 0304 and 0306. FIG. 4 illustrates implementations of loops. The shaded modules may be generated by macros (0420, 0421). Macro 0421 may also be inserted by analyzing the graphs for undelayed feedbacks.

Figure 4A:
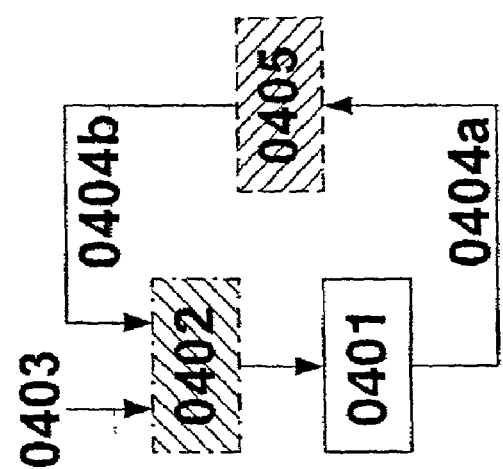

FIG. 4a illustrates the implementation of a simple loop of the type
WHILE TRUE DO
x1:=x1+1;

at the heart of the loop, the counter+1 (0401) is located. 0402 is a multiplexer which, at the beginning, conducts the starting value of x1 (0403) to 0401 and then the feedback (0404a, 0404b) with each iteration. A register (0405) may be inserted into the feedback in order to prevent any undelayed, and thus uncontrolled, feedback of the output of 0401 to its input. Register 0405 may be clocked with the operating clock of the VPU and thus determines the iterations per unit time. The respective count may be picked up at 0404a or 0404b. However, the loop is not terminated depending on the definition of the high-level language. For example, 0404 may be used in a HDL (e.g. VHDL, Verilog)), whereas 0404 may not be used in a sequential programming language (e.g. C) since the loop does not terminate and thus does not supply an exit value.

0402 may be produced as a macro from the loop construct. The macro is instanced by the translation of WHILE. 0405 is either also part of the macro or is inserted precisely when and where an undelayed feedback exists in accordance with an analysis of the graphs.

FIG. 4b illustrates the structure of a genuine loop of the type
WHILE x1<10 DO
x1:=x1+1;

the structure corresponds basically to FIG. 4a which is why the same references have been used.

In addition, there may be a circuit which checks the validity of the result (0410) and forwards 0404a to the subsequent functions (0411) only when the termination criterion of the loop has been reached. The termination criterion is detected by the comparison x1<10 (0412). As a result of the comparison, the relevant status flag (0413) may be conducted to 0402 for controlling the loop and 0411 for controlling the forwarding of the result. 0413 may be implemented, for example, by triggers described in U.S. Pat. No. 6,081,903 (PACT08). Similarly, 0413 may be sent to a CT which thereupon detects the termination of the loop and performs a reconfiguration.

FIG. 5a illustrates the iterative calculation of
FOR i:=1 TO 10
x1:=x1*x1;

The basic function generally corresponds to FIG. 4b. 0501 calculates the multiplication. The FOR loop is implemented by a further loop according to FIG. 4b and is indicated by 0503. 0503 supplies the status of the comparison for the termination criterion. The status may be directly used for driving the iteration as a result of which 0412 (represented by 0502) is largely unnecessary.

FIG. 5b illustrates the rolling out of the calculation of
FOR i:=1 TO 10
x1;=x1*x1;

since the number of iterations at translation time is precisely known, the calculation may be mapped to a sequence of i multipliers (0510).

Figure 6:
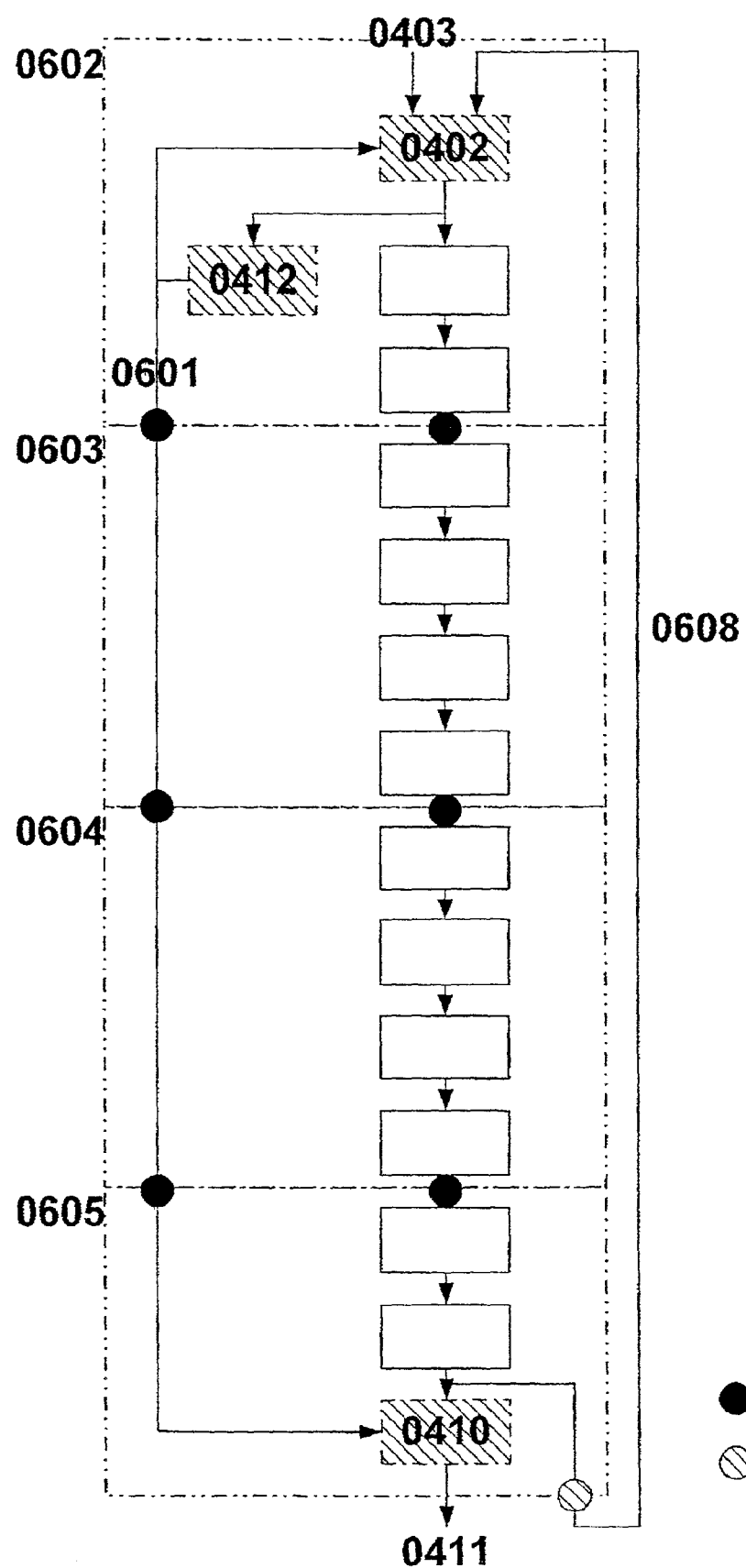
FIG. 6 illustrates the execution of a WHILE loop according to FIG. 4b over a number of configurations.

FIG. 6 illustrates the execution of a WHILE loop according to FIG. 4*b* over a number of configurations. The state of the loop (0601) is here a relevant state since it significantly influences the function in the subsequent configurations. The calculation extends over 4 configurations (0602, 0603, 0604, 0605). Between the configurations, the data are stored in memories (0606, 0607). 0607 also replaces 0405.

As a reconfiguration criterion, the fill ratio of the memories (0606, 0607: memory full/empty) and/or 0601, which indicates the termination of the loop, may be used. In other words, the fill ratio of the memories generates triggers (compare U.S. Pat. No. 5,943,242 (PACT01), U.S. Pat. No. 6,021,490 (PACT05), U.S. Pat. No. 6,081,903 (PACT08), U.S. Ser. No. 09/623,052 (PACT10) which are sent to the CT and trigger a reconfiguration. The state of the loop (0601) may also be sent to the CT. The CT may then configure the subsequent algorithms when the termination criterion is reached or possibly first process the remaining parts of the loop (0603, 0604, 0605) and then load the subsequent configurations.

Limits of Parallelability

FIG. 6 illustrates the limits of parallelability.

a) If the calculation of the operands is independent of the feedback 0608, the loop may be calculated in blocks, i.e. in each case by filling the memories 0606/0607. This results in a high degree of parallelism.

b) If the calculation of an operand is dependent on the result of the previous calculation, that is to say 0608 is included in the calculation, the method becomes more inefficient since in each case only one operand may be calculated within the loop.

If the usable ILP (Instruction Level Parallelism) within the loop is high and the time for reconfiguration is low (compare U.S. Pat. No. 6,425,068 B1 (PACT02), U.S. Pat. No. 6,088,795 (PACT04), U.S. Ser. No. 10/009,649 (PACT13), German Patent Application No. 100 28 397.7 (PACT17)), a calculation rolled out to PAEs may still be efficient on a VPU.

If this is not the case, it may be useful to map the loop to a sequential architecture (a separate processor from PA or implementation within the PA described in U.S. Pat. No. 6,425,068 B1 (PACT02), U.S. Pat. No. 6,088,795 (PACT04) and especially U.S. Ser. No. 10/009,649 (PACT13) (FIG. 5, 11, 16, 17, 23, 30, 31, 33)).

The calculation times may be analyzed either at translation time in the compiler in accordance with the next section or may be measured empirically at run time and subsequently optimized.

Analysis and Paralleling Method

For the analysis and performance of the paralleling, various conventional methods are available.

In the text which follows, a preferred method will be described.

Functions to be mapped, where an application may be composed of an arbitrary number of different functions, are represented by graphs (compare U.S. Ser. No. 10/009,649 (PACT13)). The graphs are examined for the parallelism contained in them and all methods for optimizing may be used ab initio.

Instruction Level Parallelism (ILP)

ILP expresses which instructions may be executed at the same time. Such an analysis is possible on the basis of dependencies of nodes in a graph. Corresponding methods are conventional and in mathematics. Reference is made, for example, to VLIW compilers and synthesis tools.

Attention may need to be paid to, e.g., possible interleaved conditional executions (IF) since a correct statement of the path which may be executed in parallel may frequently be scarcely made or not at all since there is a great dependence on the value space of the individual parameters which is frequently not known or only inadequately. A precise analysis may also pick up such an amount of computing time that it may no longer be usefully performed.

In such cases, the analysis may be simplified, for example, by notes by the programmer and/or it is possible to work in such a manner in accordance with corresponding compiler switches that, in the case of doubt, the starting point has to be either a high parallelability (possible by losing resources) or a lower parallelability (possibly by losing performance). As well, an empirical analysis may be performed at run time in these cases. As described in U.S. Ser. No. 09/623,052 (PACT10), German Patent Application No. 100 28 397.7 (PACT17), methods are available which allow statistics about the program behavior at run time. In this manner, a maximum parallelability may be initially assumed, for example. The individual paths report each pass back to a statistics unit (e.g., implemented in a CT (compare U.S. Ser. No. 09/623,052 (PACT10) and German Patent Application NO. 100 28 397.7 (PACT17)) and in principle, units according to U.S. Pat. No. 6,088,795 (PACT04) can also be used). It may now be analyzed in accordance with statistical measures which paths are actually passed in parallel. Furthermore, there is the possibility of using the data at run time for evaluating which paths are passed frequently or rarely or never in parallel.

Accordingly, it is possible to optimize with a next program call. According to German Patent Application No. 100 50 442.6 (PACT22), European Patent Application No. 01 102 674.7 (PACT24) a number of configurations may be configured either at the same time and then are driven by triggers U.S. Pat. No. 6,081,903 (PACT08) or only a subset is configured and the remaining configurations are later loaded when required due to the fact that the corresponding triggers are sent to a loading unit (CT, U.S. Ser. No. 09/623,052 (PACT10)).

Figure 7A:
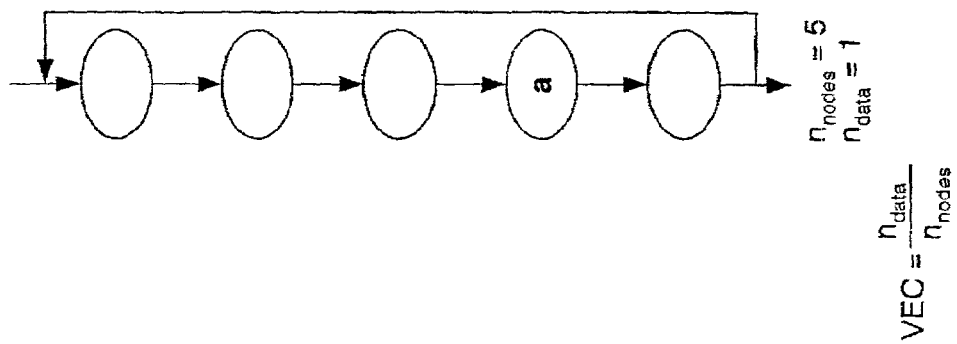
FIG. 7a illustrates the determination of PAR(p) for each row of a graph.

The value PAR(p) used in the text which follows specifies for the purpose of illustration how much ILP may be achieved at a certain stage (p) within the data flow graph transformed from the function (FIG. 7*a*).

Vector Parallelism

Vector parallelism may be useful if relatively large amounts of data are to be processed. In this case, the linear sequences of operations may be vectorized, i.e., all operations may simultaneously process data, each separate operation typically processing a separate data word.

This procedure may in some cases not be possible within loops. For this reason, analyses and optimizations may be necessary.

For example, the graph of a function may be expressed by a Petri network. Petri networks have the property that the forwarding of results from nodes is controlled as a result of which, for example, loops may be modeled.

Feeding the result back in a loop determines the data throughput. Examples:

The result of the calculation n is needed for calculation n+1:
only one calculation may be executed within the loop.

The result of the calculation n is needed for calculation n+m:
m−1 calculations may be executed within the loop.

The result determines the termination of the loop but does not enter into the calculation of the results: no feedback is necessary. However, false (too many) values may enter the loop, the output of the results may be interrupted immediately when the end condition has been reached at the loop end.

Before loops are analyzed, they may be optimized. For example, all possible instructions may be extracted from the loop and placed in front of or after the loop.

The value VEC used for illustration in the text which follows characterizes the degree of vectorizability of a function. In other words VEC indicates how many data words may be processed simultaneously within a set of operations. VEC may be calculated, for example, from the number of arithmetic logic units needed for a function $n_{nodes}$ and of the data $n_{data}$ which may be calculated at the same time within the vector, e.g., by VEC=$n_{data}/n_{nodes}$.

Figure 7B:
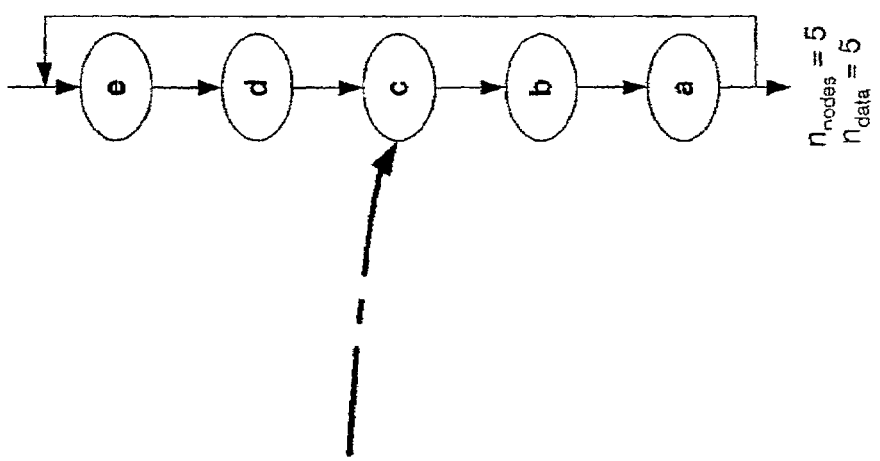
FIGS. 7b and 7c illustrate the VEC calculations of two functions.
Figure 7C:
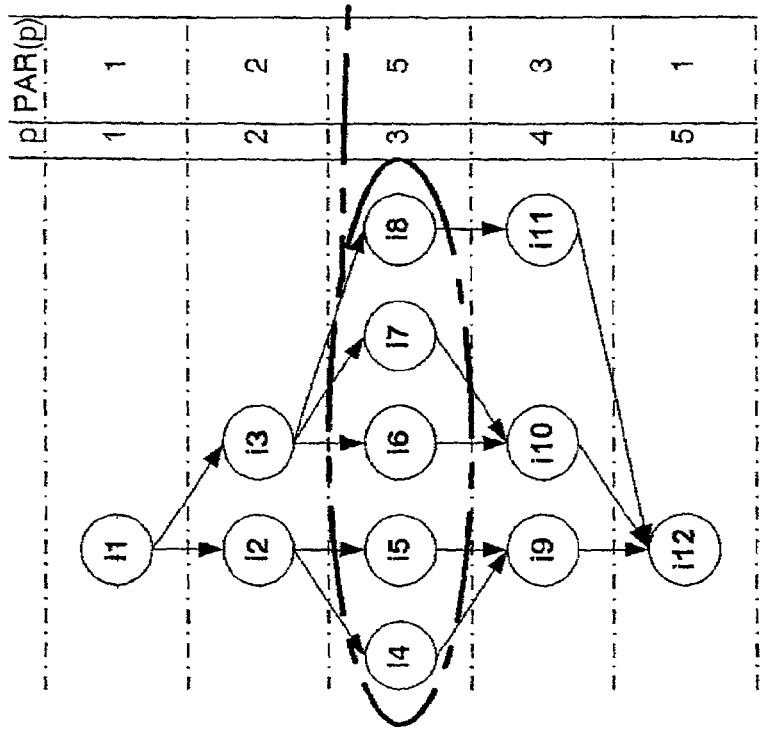

If a function may be mapped, for example up to 5 arithmetic logic units ($n_{nodes}$=5) and data may be processed at the same time in each of the arithmetic logic units ($n_{data}$=5), VEC=1 (FIG. 7b). If a function may be mapped, for example onto 5 arithmetic logic units ($n_{nodes}$=5) and data may be processed in each case in only one arithmetic logic unit, e.g., due to a feedback of the results of the pipeline to the input ($n_{data}$=5), VEC=1/5 (FIG. 7c).

VEC may be calculated for an entire function and/or for part-sections of a function.

Evaluation of PAR and VEC

According to FIG. 7a, PAR(p) is determined for each row of a graph. A row of a graph is defined by the fact that it is executed within one clock unit. The number of operations depends on the implementation of the respective VPU.

If PAE(p) corresponds to the number of nodes in the row p, all nodes may be executed in parallel.

If PAR(p) is smaller, certain nodes may be executed only in alternation. The alternative executions of in each case one node are combined in each case in one PAE. A selection device enables the alternative corresponding to the status of the data processing to be activated at run time as described, for example, in U.S. Pat. No. 6,081,903 (PACT08).

VEC may be allocated to each row of a graph, also. If VEC=1 for one row, this means that the row remains in existence as pipeline stage. If a row is less than 1, all subsequent rows which are also less than 1 are combined since pipelining is not possible. According to the order of operations, these are combined to form a sequence which is then configured in a PAE and is sequentially processed at run time. Corresponding methods are according to, for example, U.S. Pat. No. 6,425,068 B1 (PACT02) and/or U.S. Pat. No. 6,088,795 (PACT04).

Parallel Processor Models and Reentrant Code

Using the method described, parallel processor models or any complexity may be built up by grouping sequencers. In particular, sequencer structures for mapping reentrant code may be generated.

The synchronizations necessary in each case for this purpose may be performed, for example, by the time stamp method described in German Patent Application No. 101 10 530.4 (PACT18).

Influence on Clocking

If a number of sequences or sequential parts are mapped onto a PA, it may then be useful to match the power of the individual sequences to one another for reasons of power consumption. This may be done in such a manner that the operating frequencies of the sequencers may be adapted to one another. For example, methods according to German Patent Application No. 101 35 210.7-53 (PACT25) and German Patent Application No. 101 10 530.4 (PACT18) allow individual clocking of individual PAEs or PAE groups.

The frequency of a sequencer may be determined in accordance with the number of cycles which it typically needs for processing its assigned function.

If, for example, if it needs 5 clock cycles for processing its function, its clocking should be 5-times higher than the clocking of the remaining system.

Partitioning and Scheduling

Functions may be partitioned in accordance with the aforementioned method. During partitioning, memories for data and relevant status may be correspondingly inserted. Other alternative and/or more extensive methods are described in U.S. Ser. No. 10/009,649 (PACT13) and German Patent Application No. 101 10 530.4 (PACT18).

Some VPUs offer the possibility of differential reconfiguration according to U.S. Pat. No. 5,943,242 (PACT01), U.S. Ser. No. 09/623,052 (PACT10), U.S. Ser. No. 10/009,649 (PACT13), German Patent Application No. 100 28 397.7 (PACT17), German Patent Application No. 100 50 442.6 (PACT22), European Patent Application No. 01 102 674.7 (PACT24). This may be applied if only relatively few changes become necessary within the arrangement of PAEs during a reconfiguration. In other words, only the changes of a configuration compared with the current configuration are reconfigured. In this case, the partitioning may be such that the (differential) configuration following a configuration only contains the necessary reconfiguration data and does not represent a complete configuration.

The reconfiguration may be scheduled by the status which reports function(s) to a loading unit (CT) which selects and configures the next configuration or part-configuration on the basis of the incoming status. In detail, such methods are according to U.S. Pat. No. 5,943,242 (PACT01), U.S. Pat. No. 6,021,490 (PACT05), U.S. Ser. No. 09/623,052 (PACT10), U.S. Ser. No. 10/009,649 (PACT13), German Patent Application No. 100 28 397.7 (PACT17).

Furthermore, the scheduling may support the possibility of preloading configurations during the run time of another configuration. In this arrangement, a number of configurations also may be preloaded speculatively, i.e. without ensuring that the configurations are needed at all. The configurations to be used may be then selected at run time in accordance with selection mechanisms according to U.S. Pat. No. 6,081,903 (PACT08) (see also example NLS in (PACT22/24)).

The local sequences may also be controlled by the status of their data processing as is described in U.S. Pat. No. 6,425,068 B1 (PACT02), U.S. Pat. No. 6,088,795 (PACT04), and U.S. Ser. No. 10/009,649 (PACT13). To carry out their reconfiguration, a further dependent or independent status may be reported to the CT (see, for example, U.S. Pat. No. 6,088,795 (PACT04), LLBACK).

In the text which follows, the following symbols are used for simplifying the notation: ∨, which stands for or, and ∧, which stands for and.

FIG. 8a illustrates the mapping of the graph of FIG. 7a onto a group of PAEs with maximum achievable parallelism. All operations (Instruction i1–i12) are mapped into individual PAEs.

FIG. 8b illustrates the same graph, for example with maximum usable vectorizability. However, the sets of operations V2=(i1, i3), V3=(i4, i5, i6, i7, i8), V4=(i9, i10, i11) are not parallel (par({2,3,4})=1. This allows resources to be saved by in each case allocating one set P2, P3, P4 of operations to one PAE. The operations to be executed in the respective PAE may be selected by a status signal for each data word in each stage. The PAEs may be networked as pipeline (vector) and each PAE performs one operation per clock cycle over, in each case, different data words.

Sequence:

PAE1 calculates data and forwards them to PAE2. Together with the data, it forwards a status signal which indicates whether i1 or i2 is to be executed.

PAE2 further calculates the data of PAE1. The operation to be executed (i1, i2) may be selected and calculated in accordance with the incoming status signal. In accordance with the calculation, PAE2 forwards a status signal to PAE3 which indicates whether (i4∨i5) (i6∨i7∨i8) is to be executed.

PAE3 further calculates the data of PAE2. The operation to be executed (i4∨i5) (i6∨i7∨i8) may be selected and calculated in accordance with the incoming status signal. In accordance with the calculation, PAE3 forwards a status signal to PAE4 which indicates whether i9∨i10∨i11 is to be executed.

PAE4 further calculates the data of PAE3. The operation to be executed i9∨i10∨i11 may be selected and calculated in accordance with the incoming status signal.

PAE5 further calculates the data of PAE4.

A possible corresponding method is described in U.S. Patent No. 6,081,903 (PACT08) (FIGS. 5 and 6); U.S. Pat. No. 6,088,795 (PACT04) and U.S. Ser. No. 09/623,052 (PACT10), U.S. Ser. No. 10/009,649 (PACT13) also describe generally usable methods.

FIG. 8c again illustrates the same graph. In this example, vectorization is not possible but PAR(p) is high which means that in each case a multiplicity of operations may be executed simultaneously within one row. The operations which may be performed in parallel are P2={i1∧i2}, P3={i4∧i5∧i6∧i7∧i8}, P4={i9∧i10∧i11}. The PAES may be networked in such a manner that they may arbitrarily exchange any data with one another. The individual PAEs only perform operations if there is an ILP in the corresponding cycle and are otherwise neutral (NOP) and, if necessary, the clock and/or power may be switched off in order to minimize the power dissipation.

Sequence:

In the first cycle, only PAE2 is operating and forwards the data to PAE2 and PAE3.

In the second cycle, PAE2 and PAE3 are operating in parallel and forward their data to PAE1, PAE2, PAE3, PAE4, PAE5.

In the third cycle, PAE1, PAE2, PAE3, PAE4, PAE5 are operating and forward the data to PAE2, PAE3, PAE5.

In the fourth cycle, PAE2, PAE3, PAE5 are operating and forward the data to PAE2.

In the fifth cycle only PAE2 is operating.

The function thus needs 5 cycles for calculation. The corresponding sequencer thus may operate with 5-times the clock in relationship to its environment in order to achieve a corresponding performance.

A possible corresponding method is described in U.S. Pat. No. 6,425,068 B1 (PACT02) (FIGS. 19, 20 and 21); U.S. Pat. No. 6,088,795 (PACT04) and U.S. Ser. No. 09/623,052 (PACT10), U.S. Ser. No. 10/009,649 (PACT13) also describe generally usable methods which, however, are more elaborate.

FIG. 8d illustrates the graph of FIG. 7a for the case where there is no usable parallelism at all. To calculate a data word, each stage may need to be successively passed. Within the stages, only exactly one of the branches is always processed.

The function also needs 5 cycles for the calculation, cy1=(i1), cy2=(i2∨i3), cy3=(i4∨i5∨i6∨i7∨i8), cy4=(i9∨i10∨i11), cy5=(i12). The corresponding sequencer should thus operate at 5-times the clock in relationship to its environment in order to achieve a corresponding performance.

Such a function may be mapped, for example, similarly to FIG. 8c in accordance with a simple sequencer according to U.S. Pat. No. 6,425,068 B1 PACT02 (FIGS. 19, 20 and 21). U.S. Pat. No. 6,088,795 (PACT04) and U.S. Ser. No. 09/623,052 (PACT10), U.S. Ser. No. 10/009,649 (PACT13) generally describe usable methods which, however, are more elaborate.

The mappings illustrated in FIG. 8 may be mixed and grouped as required.

In FIG. 9a for example, the same function is illustrated in which the path (i2∧(i4∨i5)∧i9) and (i3∧(i6∧i7∨i8)∧(i10∧i11)) may be executed in parallel. (i4∨i5), (i6∨i7∧i8), (i10∨i11) are in each case alternating. The function may also be vectorized. It thus makes it possible to build up a pipeline in which 3 PAEs (PAE4, PAE5, PAE7) in each case determine the function to be executed by them in each case in accordance with status signals.

FIG. 9b illustrates a similar example in which no vectorization is possible. However, the paths (i1∧i2∧(i4∨i5)∧i9∧i12) and (i3∧(i6∨i7∨i8)∧(i10∨i11) are in parallel.

This makes it possible to achieve the optimum performance by using two PAEs which also process the parallel paths in parallel. The PAEs may be synchronized to one another in accordance with status signals which are generated by PAE1 since it calculates the beginning (i1) and the end (i12) of the function.

It should be noted that a multiple arrangement of sequencers may result in a symmetric parallel processor model (SMP) or similar multiprocessor models currently used.

Furthermore, it should be pointed out that all configuration registers for the scheduling may also be loaded with new configurations in the background and during the data processing. For example,:

In the method described in U.S. Pat. No. 6,425,068 B1 (PACT02), independent storage areas or registers are available which may be executed independently. Certain places are jumped to by incoming triggers and jumping is also possible in accordance with jump instructions (JMP, CALL/RET) which may also be conditionally executable.

In the method described in U.S. Pat. No. 6,088,795 (PACT04), write and read pointers are independently available as a result of which, in principle, an independence and thus the possibility of access in the background, are given. In particular, it is possible to segment the memories as a result of which additional independence is given. Jumping is possible in accordance with jump instructions (JMP, CALL/RET) which may also be conditionally executable.

In the method according to U.S. Pat. No. 6,081,903 (PACT08), the individual registers which may be selected by the triggers are basically independent and therefore allow an independent configuration, particularly in the background. Jumps within the registers are not possible and selection takes place exclusively via the trigger vectors.

What is claimed is:

1. A method for translating a high-level language program into configurations for a reconfigurable architecture, comprising:

building a finite automaton forming a complex combinational network for control flow and data handling using a plurality of individual operations in accordance with the complex combinational structure of the finite automaton;

splitting the finite automaton into configurations, each including at least a part of the control flow handling and at least a part of the data handling, to be successively executed by the reconfigurable architecture, the splitting being performed in a manner that maximizes a number of data packets that are calculable without a reconfiguration; and allocating a plurality of memories to the network for storing at least one of data and states between at least one pair of successively executed configurations, the at least one of data and states being stored by execution of a first one of the pair and being retrieved from the plurality of memories via execution of a second one of the pair, the second configuration being executed after the first configuration.

2. The method according to claim 1, further comprising:

for the finite automaton, defining a plurality of rows that are each executable within one clock unit of the architecture;

for each of the plurality of rows, calculating a value based on a number of data words that are processable within the row and a number of arithmetic logic units that are required; and if the value of more than one of the plurality of rows indicates that the number of data words that are processable within a corresponding row is less than the number of arithmetic logic units that are required for the corresponding row, combining the more than one of the plurality of rows to form a sequence to be configured in the reconfigurable architecture for sequential processing.

3. The method of claim 2, further comprising:

for each of a plurality of defined sequences, determining a number representing cycles used for processing a function assigned to the sequence; and in accordance with the determinations, grouping the plurality of defined sequences for configuration onto the reconfigurable architecture.

* * * * *